Aug. 8, 1967  F. ORSI  3,334,947
SUCTION-OPERATED SWITCH MEANS FOR BIFURCATIONS
OF PNEUMATIC CONVEYOR TUBES
Filed Aug. 15, 1966  2 Sheets-Sheet 1
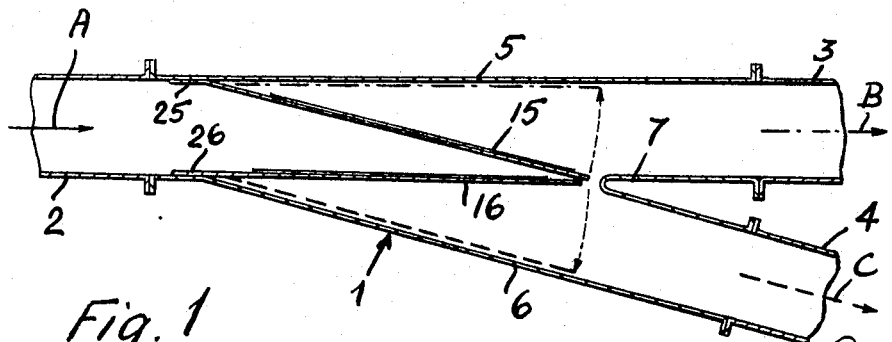
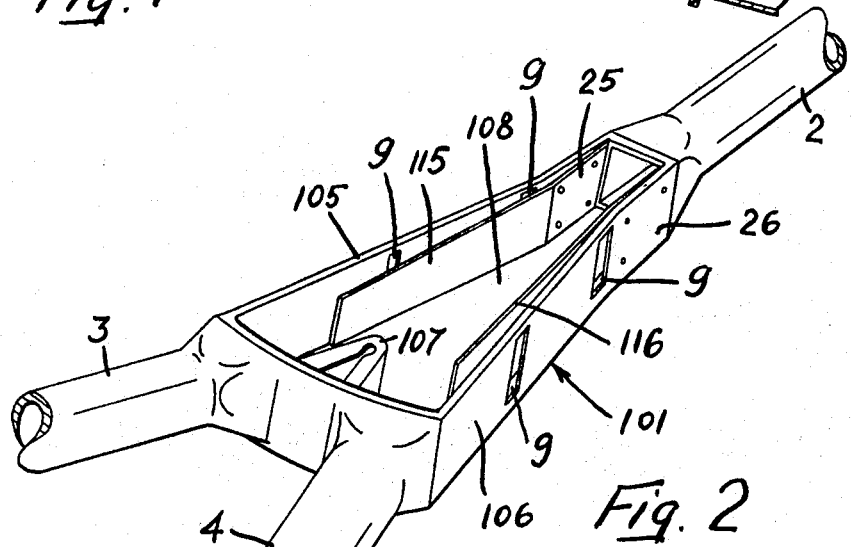
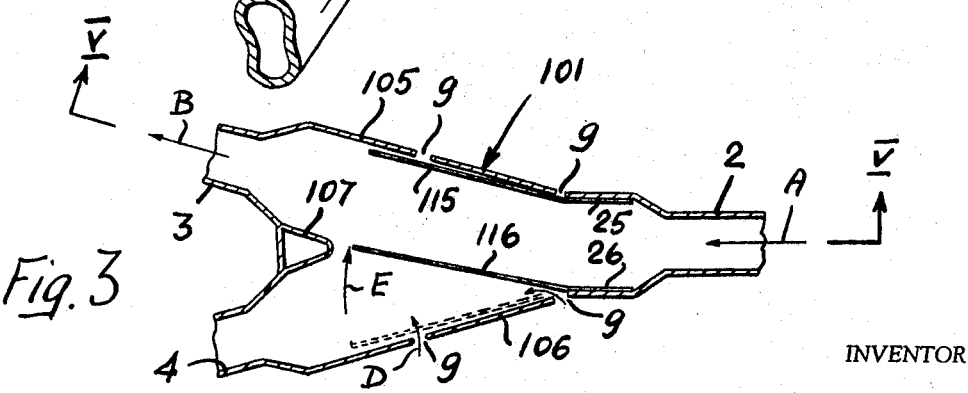
INVENTOR
FRANCO ORSI
BY
ATTORNEY

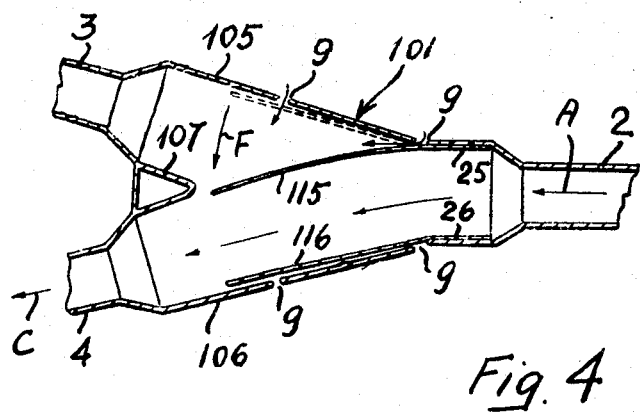
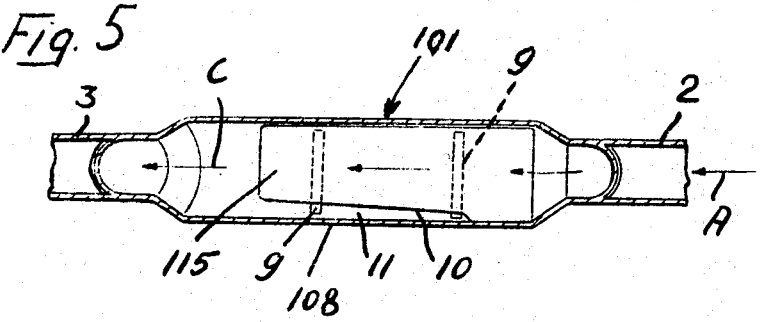
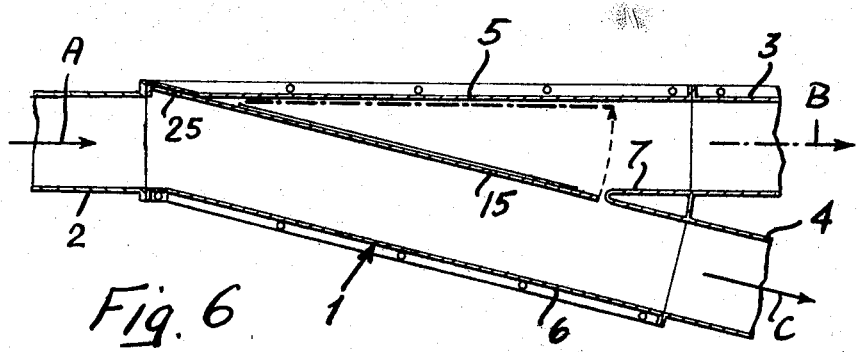

United States Patent Office 3,334,947
Patented Aug. 8, 1967

---

3,334,947
SUCTION-OPERATED SWITCH MEANS FOR BIFURCATIONS OF PNEUMATIC CONVEYOR TUBES
Franco Orsi, Bologna, Italy, assignor to American Machine & Foundry Company, a corporation of New Jersey
Filed Aug. 15, 1966, Ser. No. 572,331
Claims priority, application Italy, July 5, 1966, 15,734/66
5 Claims. (Cl. 302—28)

This invention relates to suction-operated automatic switch means for pneumatic conveyor plants particularly adapted for the pneumatic conveyance of particulated material, such as shredded tobacco, and aims to provide tube junction and air flow switch means—which shall be briefly referred to as "switch box"—adapted for mounting at the bifurcations of the conveyor tubes and for automatically shifting the air flow towards the tube branchings which are put under suction.

To this purpose, according to the invention, the said switch box comprises a casing having the shape of a Y or of a triangle (which may be either an isosceles triangle or a rectangle triangle) provided with attachment means for three tubes at the bifurcation, whereby the feed tube, i.e., the tube mounted before the switch box, is connected to what will be called the "top" of the casing which corresponds to the shank of the Y or to the top apex of a non-obtuse-angled triangle, which remains in front of the basis of the triangle to which the connections for the two delivery tubes are provided. In case of a Y shaped box, the connections of said delivery tubes are provided at the ends of the wings of the Y.

Inside said casing, in correspondence of its top elastically swingable deflecting blades or "flaps" are fastened which are so mounted that, whenever a suction or vacuum is applied to either one of the delivery tubes, they permit to the air flow to freely pass between the feed tube and the delivery tube that is under suction and, if necessary, intercept the inlet to the other one of the delivery tubes, at the bifurcation.

According to an embodiment of the invention, the side walls of the box (i.e., the walls connecting the top apex of the casing with its basis) are unperforated and the flaps are so mounted as to intercept, in rest position, at least one of the inlets to the delivery tubes, while when suction is applied to either of the delivery tubes, said suction acts so as to clear the corresponding delivery tube inlet from any obstruction, including a flap, if any, and to permit the flow of air and particulated matter carried thereby from the feed tube to the delivery tube under suction.

In a variation of this embodiment, if one of the delivery tubes is in line or co-axial with the feed tube, a single flap may be provided for intercepting the communication between the two co-axial tubes when the suction is applied to the non-coaxial or inclined delivery tube, while no flap may be necessary for intercepting the communication with said inclined tube whenever the air flows freely from the feed to the co-axial delivery tube.

According to another embodiment, the side walls of the box are provided with apertures or slits which are closed by a corresponding flap when this is in rest position. When a suction is applied to either of the delivery tubes, the corresponding flap is pressed by the air flow against the corresponding box side wall, while the same suction, by creating a vacuum in the said box, beyond the flow path, causes the outside air to penetrate through the slits closed by the opposite flap and swings this flap towards the interior of the box, to the position in which it intercepts the flow towards the delivery tube which is not under suction.

The invention will be better understood from the following specification made with reference to the accompanying drawings, in which:

FIGURE 1 is a horizontal longitudinal section through a first embodiment of switch box for bifurcations of pneumatic conveyor tubes, said switch box having unperforated casing and two flaps which, in rest position, intercept each the inlet to one of the delivery tubes;

FIGURE 2 is a perspective view of a triangular switch box having perforated side walls each closed by a flap in rest position;

FIGURES 3 and 4 show diagrammatically in longitudinal section the switch box of FIGURE 2 with the flaps in two different switching positions;

FIGURE 5 is a longitudinal vertical section on line V—V of FIGURE 3 and

FIGURE 6 shows diagrammatically a single-flap switch box, which may be considered as a variation of the embodiment of FIGURE 1 and which may be adopted whenever one of the delivery tubes is in line with the feed tube.

With reference to the embodiment as shown in FIGURE 1, the switch box 1 for connecting a feed tube 2 with either one of the delivery tubes 3 and 4 in a suction-operated pneumatic conveyor installation for particulated material such as shredded tobacco, consists of a substantially triangular or Y-shaped casing in which the feed tube 2 is connected to the shank of the Y or to the top apex of the triangle while the branch tubes 3 and 4 are connected to the Y-wings ends or to the apices at the basis of the said triangular casing.

In this embodiment, branch tube 3, is shown substantially co-axial to feed tube 2, while branch tube 4 is inclined with respect thereto: Each of said branch tubes 3 and 4 is substantially aligned with the corresponding side wall 5 resp. 6 of the casing of said switch box.

In box 1, in proximity of its apex, by 25 and 26 the end sections of flaps 15 and 16 are fastened, whose free ends converge towards a wedge-shaped partition wall 7 which separates the inlet ends of the delivery tubes 3 and 4. Flaps 15 and 16 are preferably made from flexible sheet material suitably stiffened in correspondence of their swinging section by conventional means, as by ribs or by fastening thereon a rigid blade.

In rest position, as shown by full lines in FIGURE 1 both flaps 15 and 16 converge towards the wedge of the partition 7. When the particulated material is to be conveyed straight ahead, suction is applied to tube 3, flap 15 is urged by air flow from feed tube 2 towards side wall 5 of box 1 and assumes the dotted line position, while flap 16 remains in its rest position. Thus the air and the material carried thereby flow from feed tube 2 straight ahead towards aligned delivery branch tube 3 (arrows A–B), while flap 16 in rest position intercepts the inlet to inclined branch tube 4.

When on the contrary the particulated material should be conveyed towards branch tube 4, suction is applied to this branch so as to promote an air flow from A in the direction of branch C and thus flap 15 remains in rest position and flap 16 is blown from the air flowing from A towards box side wall 6, in the position as shown by dash lines in FIGURE 1.

The same system of two flaps which converge when in rest position may be adopted also for switch boxes in which both delivery branch tubes 3 and 4 are inclined with respect to feed tube 2.

The embodiment of switch box as shown in FIGURES 2 through 5 comprises a substantially isosceles rectangular box casing 101 provided at its top apex with an attachment for feed tube 2 and, at the apices by the basis, with two attachments for the delivery branch tubes 3 and 4, which, at least in their first part, are directed substantially parallel to box side walls 105 and 106, respectively, which are provided with slits 9. Between the adjoining inlets of branch tubes 3 and 4 a projecting wedge-shaped partition 107 is provided, and thus the interior of box casing 101 assumes substantially a Y-shape.

Flaps 115 and 116 are fastened by their ends 25 and 26 oppositely to each other in proximity of the outlet tube 2, while their freely oscillating sections are urged, in rest position, by spring means against the side walls 105 and 106, respectively, so as to effect a closure of the slits 9 of said walls. Said spring means may be provided by the resiliency of the same sheet material from which the flaps 115, 116 are made, or also the oscillating part of the flaps may be connected to the fixed part, 25 or 26 by conventional springs hinges, which as they may be of known construction, need not to be described or shown.

In operation, when suction is applied to tube 3, an air flow is generated within tubes 2 and 3 and along flap 115 which is pressed by the air flow in trailing direction against the box wall 105, so as to close slits 9. At the same time, the air flow generates a partial vacuum within the part of box 101 beyond partition 107, so that the outside air through slits 9 of wall 106 (FIGURE 3) penetrates within the box 101 (arrow D) and pushes flap 116 in the direction of partition 107 (arrow E), thus intercepting the passage to branch tube 4.

The contrary takes place when suction (indicated by the arrow C) is applied to branch tube 4 (FIGURES 4 and 5), in which case it is flap 115 which is swung in the direction of arrow F, while the flow of air which conveys the particulated matter flows in the direction of arrows A–C.

As it may be seen in FIGURES 2 and 5, the width of flaps 115, 116 decreases by progressing towards the tips, so that between the bottom wall 108 of box 101 and the corresponding flap edges a gap 11 of increasing width in the direction of the flow, is left free so as to avoid clamping therebetween of solid particles while blowing off by the air flow of any particle which could by entangled therebetween. Furthermore the tips of said flaps 115, 116 do not come into contact with the ridge of partition 7, FIGURE 1 or 107, FIGURES 2 to 5, thus avoiding the entanglement of solid particles therebetween.

It may be mentioned that, whenever one of the delivery tubes (in the example as shown, tube 3) is co-axial with the feed tube 2, the switch shown in FIGURE 1 may be simplified in FIGURE 6, by mounting in the switch box casing a single flap 15 which is urged by conventional spring means in the position in which it intercepts the inlet of branch tube 3, which is in line with feed tube 2, whenever the suction is applied to branch tube 4. In this case, the particulated matter is conveyed by the air flow in the direction of arrow A–C.

When on the contrary the suction is applied to delivery tube 3 co-axial with feed tube 2, flap 15 is swung by the air flow against box wall 5, as shown by dotted lines, and the air and particulated matter flow straight ahead in the direction of arrows A–B, and due to this possibility of free flow, there is practically no substantial branching of the flow towards the inclined branch tube 4.

Of course, the invention may undergo numerous changes all falling within the scope of the appended claims. Thus, while the flaps have been shown as simple sheets or blades, reinforced or not and has been assumed that they possess an own springiness which permits their returning to a fixed (rest) position when not pushed on opposite direction by an air flow, it is to be understood that the flaps may possess conventional spring hinges and abutment means adapted to permit their elastic swinging.

I claim:
1. Automatic switch means for bifurcations of suction-operated pneumatic conveyor tubes for particulated material, such as shredded tobacco or the like, said switch means comprising a substantially Y-shaped junction box; means for connecting the outlet of a pneumatic feed tube to the shank or apex of the Y; means for connecting to the shanks of the Y the inlets of two pneumatic delivery tubes, adapted to be connected at will to suction means, and at least one elastically swinging deflecting plate or flap fastened to the box in proximity of the outlet of the said feed tube and adapted to intercept the inlet of one of the said two delivery tubes when suction is applied to the other of said delivery tubes.

2. Automatic switch means according to claim 1, in which the outside of the junction box is triangular and the inside is rendered substantially Y-shaped by fitting to the apex of the triangle a feed tube and inserting between the inlet ends of said delivery tubes a wedge-shaped wall.

3. Automatic switch means according to claim 2, in which the said junction box has the shape of a rectangle triangle and in which a single flap is provided, which is maintained by spring means substantially parallel both to the inclined box side and to the axis of the delivery tube which is parallel thereto and is blown by the air flow generated in correspondence of the delivery tube which is in line with the said suction tube, when said last named delivery tube is under suction, towards the triangle side which is parallel to the axes of said suction tube and aligned delivery tube, the length of said flap being such that it almost touches with its tip the ridge of said wedge-shaped wall.

4. Automatic switch means according to claim 2, in which said junction box has the shape of a not obtuse-angled triangle and in which a pair of flaps are provided fastened in facing relation in proximity of the feed tube outlet; spring means for maintaining said flaps converging towards and substantially remaining with their tips at a slight distance from the ridge of the said wedge-shaped partition, thus intercepting each the inlet of a corresponding delivery tube; said flaps being so formed and swingably mounted that each of them is swung clear of the inlet of the corresponding tube, whenever in said tube a suction is applied.

5. Automatic switch means according to claim 2, in which said box has substantially the shape of an isosceles triangle; apertures in the side walls of said triangle; and spring flaps fastened in facing relation in proximity of the feed tube outlet fastened in correspondence to the top apex of said triangle and each urged against the corresponding side wall, so as to close the apertures therein, while leaving both feed tube outlet and delivery tube inlets unobstructed; the whole being so mounted that whenever one of the two delivery tubes is under suction, the flap mounted in the box side corresponding to the delivery tube under suction is pressed by the air flow against the corresponding box side wall, so as to maintain the corresponding slits closed, while the opposite flap is swung from the outside air penetrating through said apertures towards the interior of the box, with its tip in proximity of the ridge of said wedge-shaped partition, thus substantially intercepting the inlet to the corresponding delivery tube.

References Cited

UNITED STATES PATENTS 3,206,140   9/1965   Knight _____ 243—29
3,253,863   5/1966   Hilliard _____ 302—28

EVON C. BLUNK, *Primary Examiner.*

H. C. HORNSBY, *Assistant Examiner.*